United States Patent
Neil et al.

(10) Patent No.: US 7,161,656 B2
(45) Date of Patent: Jan. 9, 2007

(54) METHOD OF AND APPARATUS FOR GENERATING A BEAM OF LIGHT

(75) Inventors: Mark Neil, Oxford (GB); Farnaz Massoumian, London (GB); Rimas Juskaitis, Oxford (GB); Tony Wilson, Oxford (GB)

(73) Assignee: Isis Innovation Limited (GB)

( * ) Notice: Subject to any disclaimer, the term of this patent is extended or adjusted under 35 U.S.C. 154(b) by 105 days.

(21) Appl. No.: 10/485,097

(22) PCT Filed: Jul. 18, 2002

(86) PCT No.: PCT/GB02/03282

§ 371 (c)(1),
(2), (4) Date: Nov. 1, 2004

(87) PCT Pub. No.: WO03/012528

PCT Pub. Date: Feb. 13, 2003

(65) Prior Publication Data

US 2005/0046818 A1    Mar. 3, 2005

(30) Foreign Application Priority Data

Jul. 27, 2001    (GB) .................................. 0118306.0

(51) Int. Cl.
*G03B 27/42* (2006.01)
*G03B 27/54* (2006.01)
*G03B 27/72* (2006.01)

(52) U.S. Cl. ............................. 355/53; 355/67; 355/71
(58) Field of Classification Search .................... None
See application file for complete search history.

(56) References Cited

U.S. PATENT DOCUMENTS

| 4,198,571 | A | 4/1980 | Sheppard ..................... 250/571 |
| 5,530,518 | A | 6/1996 | Ushida et al. ................ 355/53 |
| 5,552,856 | A | 9/1996 | Shiraishi et al. .............. 355/53 |
| 5,757,470 | A | 5/1998 | Dewa et al. .................. 355/67 |

FOREIGN PATENT DOCUMENTS

| EP | 0589103 | 3/1994 |
| EP | 0627643 | 12/1994 |
| EP | 0967524 | 12/1999 |
| JP | 4171415 | 6/1992 |

*Primary Examiner*—D. Rutledge
(74) *Attorney, Agent, or Firm*—Knobbe Martens Olson & Bear LLP

(57) ABSTRACT

A method and apparatus for generating a beam of light having extended depth of focus. The apparatus comprises, for instance, a binary phase mask that generates a diffraction pattern including a bright main ring and a plurality of side-lobe rings, an annular aperture mask that passing only a portion of the diffraction pattern, and a lens that causes light passing through the annular aperture to converge toward and cross an optical axis. Where the converging light crosses the optical axis, constructive interference takes place, thereby generating a beam of light that has extended depth of focus.

34 Claims, 6 Drawing Sheets

Binary phase mask        Annular amplitude mask        Objective Lens

Intensity vs. radial position  First and second order zeros are labelled

Fig. 2

On-axis intensity pattern for three different sets of limits set by the mask annulus

METHOD OF AND APPARATUS FOR GENERATING A BEAM OF LIGHT

FIELD OF THE INVENTION

The present invention relates generally to optics and, more particularly, to methods and apparatus for for use in microscopy or the like.

BACKGROUND OF THE INVENTION

In general, when collimated light is focused, a spot of light is generated having a generally defined axial and lateral extent that is limited by diffraction. An extended depth of focus beam is, by one definition, one in which the axial extent of the focal spot is increased by an arbitrary factor, which is generally greater than 5 but typically less than 20, without significantly compromising the lateral extent. For example, where with a normal lens an axial extent of about 1.5 microns and a lateral extent of approximately 0.5 microns may be achieved, an extended depth of focus beam may have an axial extent of about 15 microns and a lateral extent of about 0.5 microns.

For purposes of the present invention, while the term "light" refers generally to the visible portion of the electromagnetic spectrum, "light" as used herein also pertains to non-visible portions of the electromagnetic spectrum including, but not limited to, radiation in infrared and ultra-violet portions of the spectrum.

Extended depth of focus light beams have application in scanning optical microscopes. A scanning optical microscope is an instrument in which a focussed spot of light is scanned across an object and the light reflected from that object (or emitted by fluorescence) is collected, for example by means of a photodetector and assembled to form an image of the object. The resolution of the technique is obviously limited by the diameter of the light beam, and the depth of focus of the light beam limits the maximum size of an object that can be imaged without refocusing.

Various methods exist for generating focussed light beams. One of these methods uses an optical device called an axicon. This is a refractive element having a plane face and a conical face. When homogeneous light from a laser is passed through the axicon, it is bent inwards and crosses the optical axis at a point that is proportional to the distance from the optical axis at which the light passed through the axicon. Constructive interference takes place where the light crosses the optical axis, producing a very narrow light beam with an extended depth of focus.

The disadvantage of the axicon device is that the intensity of the light in the beam varies significantly with distance along the optical axis, which limits the usefulness of the device.

Another known method of generating a light beam with an extended depth of focus involves the use of a diffractive optical element having a set of concentric amplitude or phase rings. However, like the axicon, the intensity of the light beam again varies significantly with distance along the optical axis.

Yet another known method of generating a light beam involves the use of an annular aperture that is placed in the back focal plane of the objective lens. This produces an extended focal depth beam with good axial uniformity of intensity. However, the method is highly inefficient, since most of the light is blocked by the annular aperture mask.

OBJECTS AND SUMMARY OF THE INVENTION

Accordingly, it is an object of the present invention to provide a method and apparatus for generating a beam of light having extended depth of focus that is efficient and provides a light beam of substantially uniform axial intensity.

According to one aspect of the present invention, there is provided an apparatus for generating a beam of light having extended depth of focus. The apparatus has, arranged along an optical axis, a first section for generating in a first focal plane a diffraction pattern including a bright main ring, a second section having an annular aperture located in the first focal plane, the radius of the aperture being substantially equal to the radius of the main ring and the width of the aperture being substantially equal to or slightly greater than the width of the main ring, and a third section for causing the light passing through the aperture to converge toward and cross the optical axis. The apparatus is constructed and arranged such that constructive interference takes place where the converging light crosses the optical axis, thereby generating, along the axis, a beam of light having extended depth of focus.

In accordance with another aspect of the present invention, there is provided a method for generating a beam of light having extended depth of focus. Initially, a diffraction pattern is generated in a first focal plane, the diffraction pattern including a bright main ring. Next, the diffraction pattern is modified using an annular aperture located in the first focal plane, the radius of the aperture being substantially equal to the radius of the main ring and the width of the aperture being substantially equal to or slightly greater than the width of the main ring. Finally, the light passing through the aperture converges toward and crosses an optical axis, such that constructive interference takes place where the converging light crosses the optical axis, thereby generating, along the axis, a beam of light having extended depth of focus.

The method makes it possible to generate a light beam with substantially uniform axial intensity and an extended depth of focus. Further, the method is highly efficient, with over 75% of the input light reaching the final focal plane in some cases.

Advantageously, the first section includes a diffractive element, which may include a plurality of concentric phase rings or phase and amplitude rings. Alternatively, the first section may include a refractive element, for example an axicon.

The first section may include a positive lens element arranged such that its rear focal plane coincides with said annular aperture.

The third section may include a positive lens element arranged such that its front focal plane coincides with said annular aperture.

The apparatus may include a coherent light source, for example a collimated laser.

Advantageously, the inner radius $R_1$ and the outer radius $R_2$ of the annular aperture are defined in terms of the radii $a_1$ and $a_2$ of the minima on either side of the main lobe of the diffraction pattern, as follows:

$$R_1 = \frac{(a_1 + a_2)}{2} - k\frac{(a_2 - a_1)}{2}$$

-continued $$R_2 = \frac{(a_1 + a_2)}{2} + k\frac{(a_2 - a_1)}{2}$$

where k is a coefficient in the range 1 to 2 and preferably 1.3 to 1.6.

The width W of the annular aperture may be given by the expression $W=k(a_2-a_1)=kA$ where A is the width of the main lobe.

The annular aperture may include phase modulation elements, for example a plurality of phase rings, or a combination of phase and amplitude modulation elements.

According to a further aspect of the present invention, there is provided a scanning microscope comprising an apparatus for generating a beam of light having extended depth of focus, a device for scanning the beam across a specimen, a device for detecting light reflected or emitted by the specimen and a device for constructing an image of the specimen in response to the detected light.

The microscope may be a fluorescence scanning microscope, and in particular may be a two-photon or multi-photon microscope.

The microscope may include means for tilting the axis of the beam, wherein the imaging means is constructed and arranged to construct a stereo pair of images at different tilt angles.

According to a further aspect of the invention there is provided a method of generating a light beam with an extended depth of focus, the method including generating in a first focal plane a diffraction pattern that includes a bright main ring, modifying the diffraction pattern by means of an annular aperture located in the first focal plane, wherein the radius of the aperture is substantially equal to the radius of the main ring and the width of the aperture is substantially equal to or slightly greater than the width of the main ring, and causing the light passing through the annular aperture to converge towards and cross an optical axis, such that where the converging light crosses the optical axis constructive interference takes place, generating a light beam along said axis that has an extended depth of focus.

According to a further aspect of the invention there is provided a method of microscopy, the method including generating a light beam with an extended depth of focus by means of a method as described above, scanning the light beam across a specimen, detecting light reflected or emitted by the specimen and constructing an image of the specimen in response to the detected light.

BRIEF DESCRIPTION OF THE DRAWINGS

A specific, illustrative apparatus and method, in accordance with the present invention, will now be described with reference to the accompanying drawings, in which.

The same numerals are used throughout the drawing figures to designate similar elements. Still other objects and advantages of the present invention will become apparent from the following description of the preferred embodiments.

DETAILED DESCRIPTION OF THE PREFERRED EMBODIMENTS

Referring now to the drawings and, more particularly, to FIGS. 1–18, there is shown generally a specific, illustrative apparatus and method for generating a beam of light having extended depth of focus, in accordance with the present invention. According to one embodiment, shown in FIG. 1, the apparatus preferably comprises the following optical components which are positioned along an optical axis 2: a diffractive element 4, a positive lens 6 located with the diffractive element in its front focal plane 8, an aperture mask 10 located in a rear focal plane 12 of the lens, and an objective lens 14 located behind the mask such that the mask lies in its front focal plane 16. The apparatus is desirably illuminated with collimated laser light, which enters from the left hand side of the diagram in the general direction of the optical axis, as indicated by arrow 18.

In the first embodiment, the diffractive element 4 consists of a binary phase mask, comprising a packed series of concentric rings 20 of equal width that impart a relative phase modulation onto the laser beam alternately of 0° and 180°. This is shown in more detail in FIG. 7, in which the grey shade represents a transmission of 0, white a transmission of +1 (a phase of 0°) and black a transmission of −1 (a phase of 180°). Alternatively, an amplitude and phase modulation mask may be used.

Figure 13:
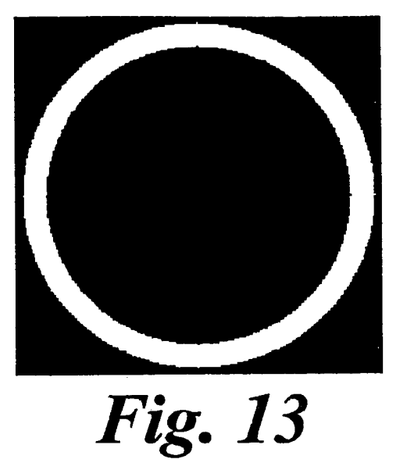

The aperture mask 10, which is shown in FIG. 13, includes an annular amplitude aperture 22 that is located concentrically with the optical axis 2. The factors determining the radius and width of the annular aperture 22 are discussed in more detail below.

Figure 2:
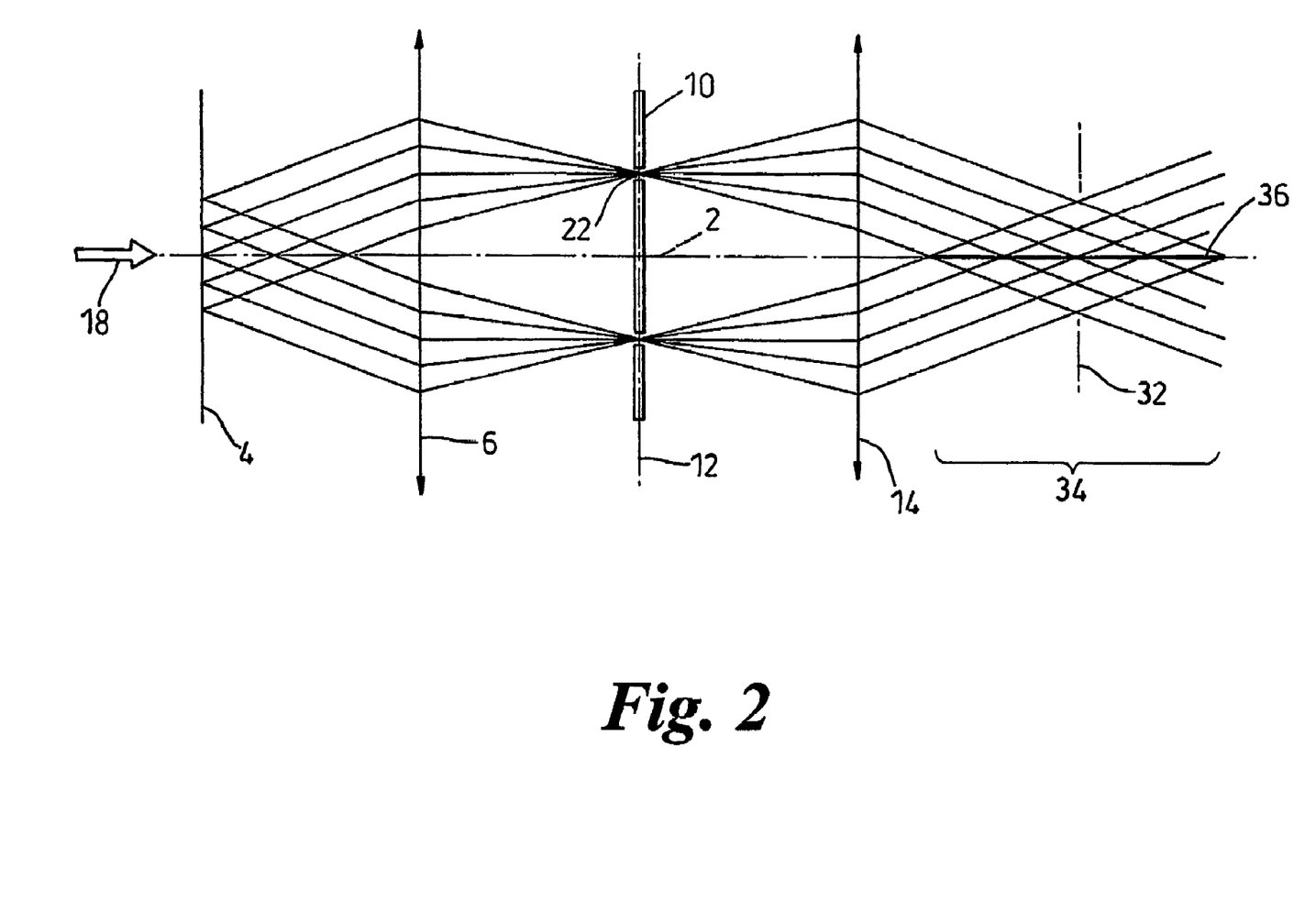
FIG. 2 is a ray diagram of the first apparatus illustrated in FIG. 1.
Figure 8:
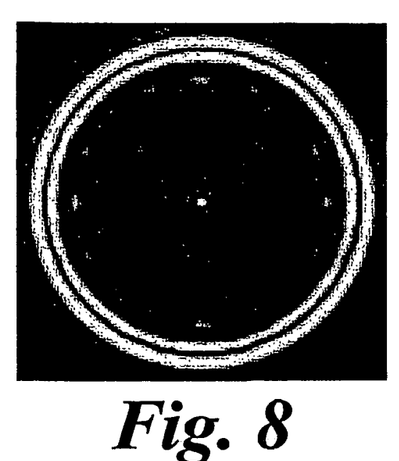
FIG. 8 shows a diffraction pattern produced by the first diffractive element illustrated in FIG. 7.

FIG. 2 is a ray diagram illustrating how light passes through the optical system. Collimated homogeneous light from a laser (not shown) enters from the left hand side of the diagram in the direction of the arrow 18 and illuminates the diffractive element 4. The light is modulated by the phase rings 20 and focussed by the first lens 6, producing a far field diffraction pattern in the rear focal plane 12 of the first lens (i.e. in the plane of the aperture mask 10). The diffraction pattern, which is shown in FIG. 8, represents the Fourier transform of the light passing through the diffractive element 4.

Figure 3:
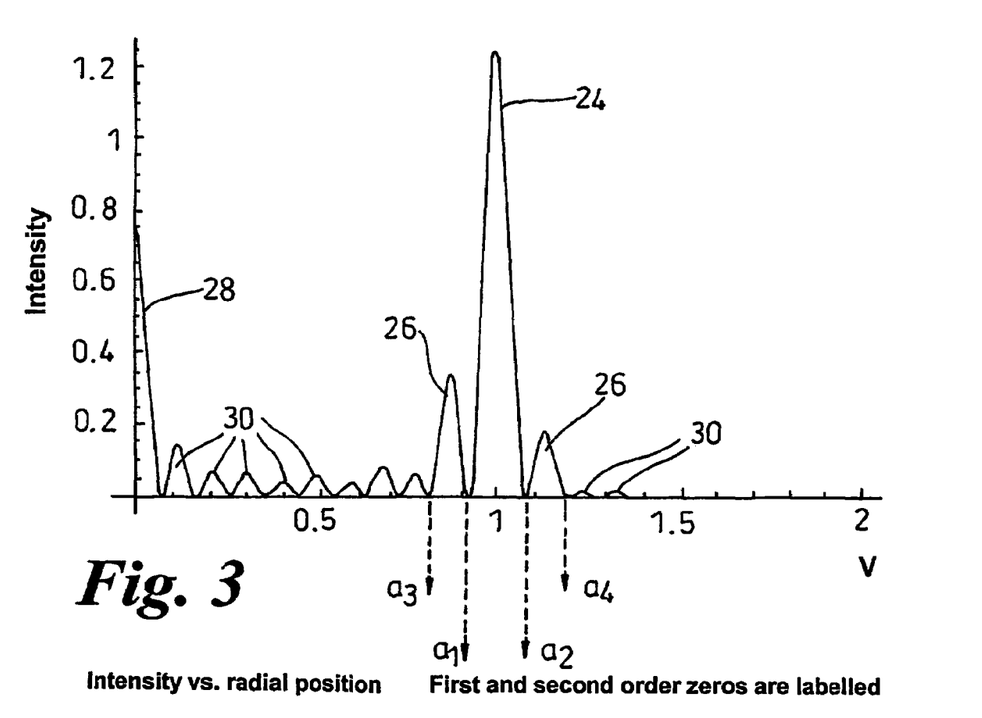
FIG. 3 is a graph of variation in intensity of a diffraction pattern vs. radial position, according to one aspect of the present invention.

The intensity distribution in a diffraction pattern produced by a ten ring diffractive element is shown in graphical form in FIG. 3, in which the intensity I is plotted against the radial position v, which is equal to the distance from the optical axis 2. The main feature of the diffraction pattern is a bright ring of light which is represented on the graph as a peak 24 at v=1. The pattern also includes a number of other features, including higher order rings (which are not depicted on the graph), side-lobe rings 26 on either side of the main ring 24, a central peak 28 that lies on the optical axis 2 (at v=0) and a number of minor rings 30 of lower intensity. The locations of the first and second order zeros are labelled $a_1$ to $a_4$, where $a_1$ and $a_2$ are the first order zeros, which are located between the main peak 24 and the inner edges of the side lobes 26, and $a_3$ and $a_4$ are the second order zeros, which are located at the outer edges of the side lobes 26.

The dimensions of the annular aperture 22 (the radius and the width of the aperture) are matched to the diffraction pattern and are selected such that only the main bright ring 24 and adjacent inner portions of the two side-lobe rings 26 pass through the mask. Thus, in the case of the diffraction pattern shown in FIG. 3, the radius will be equal to v=1 and the width will be just greater than the distance between the first order zeros, $a_1$ and $a_2$. The remaining outer portions of the two side-lobe rings 26, the central peak 28, the minor rings 30 and the higher order rings are blocked. The aperture mask 10 therefore acts as an spatial filter, passing only the main lobes 24 and portions of the side lobes 26 of the Fourier transform, and blocking all other spatial frequencies.

The light that passes through the mask 10 is refracted by the objective lens 14 and focussed in the rear focal plane 32 of that lens. A filtered image of the diffractive element 4 is formed in that plane. However, owing to the spatial filtering carried out by the aperture mask 10, which removed the higher and lower order frequencies from the Fourier transform, the image will include a bright central spot, on the optical axis 2.

It will be noted that light passing through aperture mask 10 and the objective lens 14 converges and crosses the optical axis 2 in a region 34 that extends both in front of and behind the rear focal plane 32 of the objective lens. Every point along the optical axis 2 that lies within this region is illuminated by a cone of coherent light. Constructive interference thus takes place, producing a very narrow and bright beam of light 36 that extends along the optical axis 2 for the length of the region 34.

Figure 11:
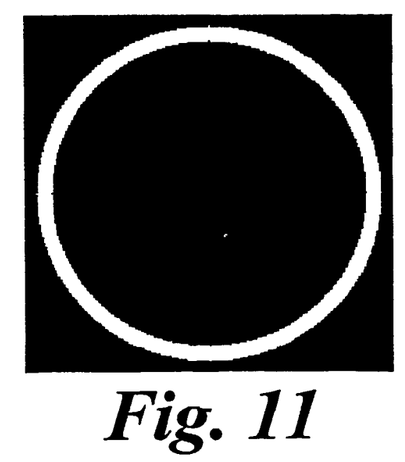
Figure 12:
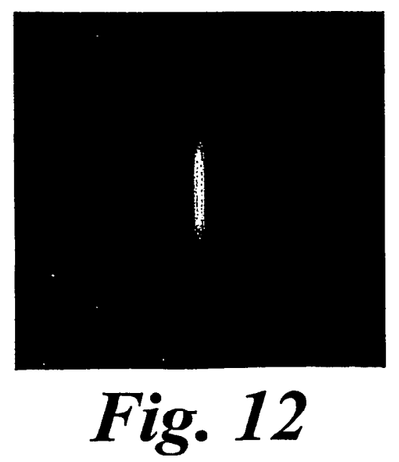

The intensity of the light in the beam 36 varies with distance along the optical axis 2, and this variation in intensity depends on the width of the annular aperture 22. This is illustrated graphically in FIG. 4, where I is the intensity and Z is the distance along the optical axis 2. The first line 38 represents the intensity when the width of the aperture is exactly equal to the width of the main ring 24: i.e. the edges of the aperture coincide with the minima between the main peak and the side-lobe rings 26. It can be seen that the intensity decreases on either side of a central maximum. This is illustrated in FIGS. 11 and 12, where FIG. 11 is a schematic front view of the aperture mask and FIG. 12 is an X-Z section that shows the axial intensity of the light beam associated with that aperture mask.

Figure 4:
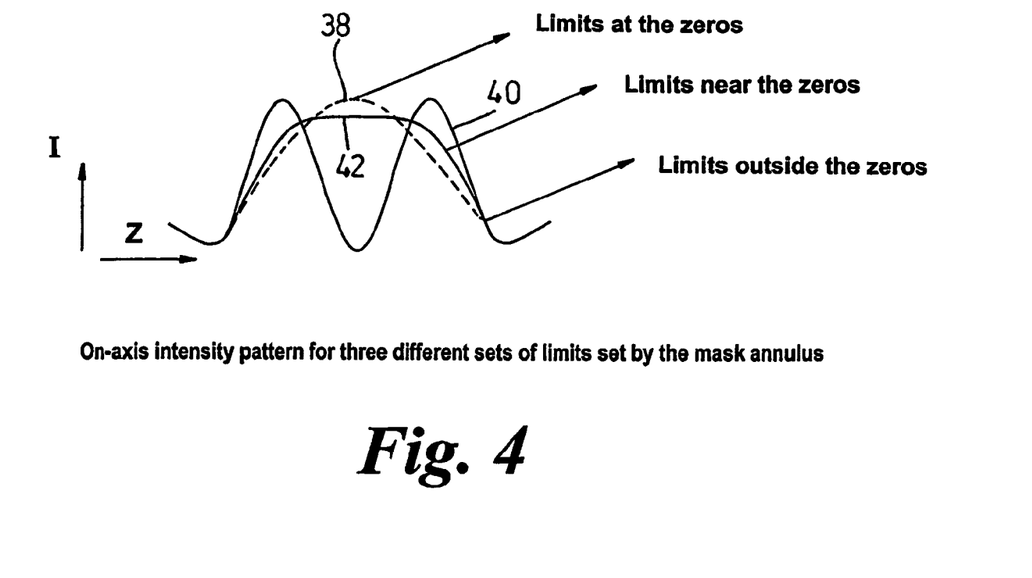
FIG. 4 illustrates on-axis intensity patterns of three different sets of limits set by a mask annulus, in accordance with the present invention.
Figure 9:
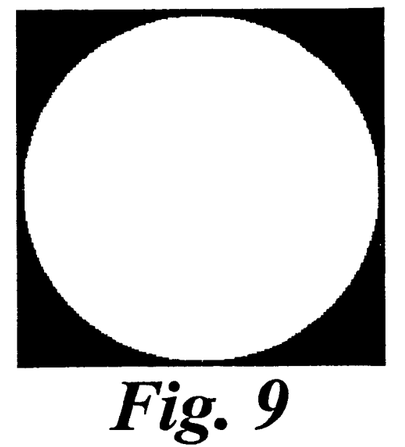
FIGS. 9, 11, 13, 15 and 17 are schematic front views of aperture masks, in accordance with various aspects of the present invention.
Figure 10:
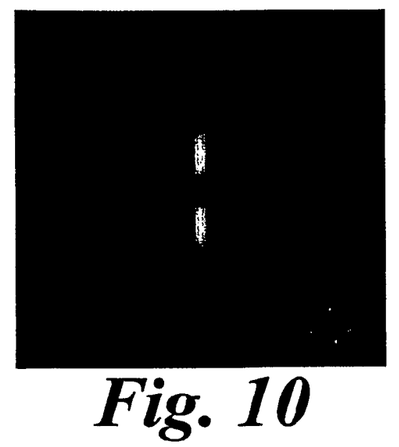
FIGS. 10, 12, 14, 16 and 18 illustrate the axial intensity of light beams associated with aperture masks, according to various aspects of the present invention.

The second line 40 represents the intensity when the width of the aperture is substantially larger than the width of the main ring 24, so that the main ring and most of the side-lobe rings 26 pass through the aperture. In this cases the intensity distribution has two peaks and a central minimum, which coincides with the position of the central peak of the first line 38. This is illustrated in FIGS. 9 and 10, where FIG. 9 is a schematic front view of the aperture mask and FIG. 10 shows the axial intensity of the light beam associated with that aperture mask.

Figure 14:
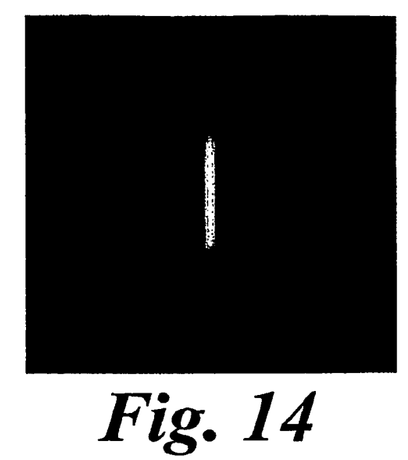

Between these two extremes there is a situation in which the intensity distribution includes a wide peak with a substantially flat top can be produced, as illustrated by the third line 42. This is achieved by making the width of the annular aperture just slightly larger than the width of the main ring 24, so that the whole of the main ring 24 and a small portion of each of the two side-lobe rings 26 passes through the aperture. The resulting intensity distribution is relatively uniform over a considerable portion of the length of the light beam 36. This is illustrated in FIGS. 13 and 14, FIG. 13 being a schematic front view of the aperture mask and FIG. 14 showing the axial intensity of the light beam associated with that aperture mask.

The exact dimensions of the annular aperture are dependent on the other parameters of the system, including in particular the distribution of light in the illuminating beams, the number and width of the rings in the diffraction element and the nature of that element (i.e. whether it is a simple binary phase mask or a more complicated phase and amplitude mask). In each case, however, the aim is to achieve a substantially uniform distribution of intensity along most of the length of the light beam.

In particular, the inner radius $R_1$ and the outer radius $R_2$ of the annular aperture can be defined in terms of the radii of the minima on either side of the main lobe 24 of the diffraction pattern, which are designated $a_1$ and $a_2$ in FIG. 3, as follows:

$$R_1 = \frac{(a_1 + a_2)}{2} - k\frac{(a_2 - a_1)}{2}$$
$$R_2 = \frac{(a_1 + a_2)}{2} + k\frac{(a_2 - a_1)}{2}$$

The required width W of the annular aperture is given by the expression:

$$W = k(a_2 - a_1) = kA$$

where A is the width of the main ring
and k is a coefficient in the range 1 to 2.

With Gaussian beams, the coefficient k is usually in the range 1.3 to 1.6.

Figure 1:
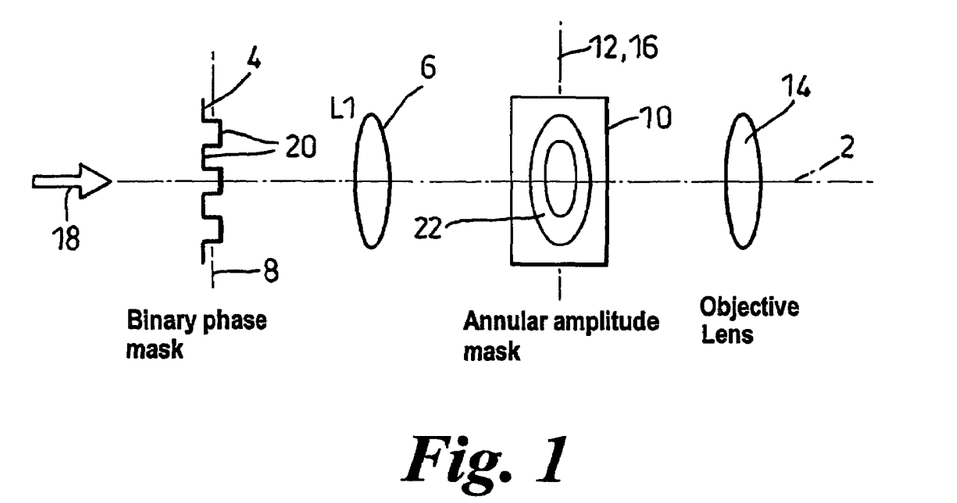
FIG. 1 is a side view of a first apparatus, according to the present invention, showing its optical components.

Some examples of suitable dimensions for the binary aperture and the mask annulus are given in Table 1. These values are for a Gaussian illumination source with a wavelength of 532 nm, where the Gaussian width is chosen such that 70% of the light is let through, the focal length of the lens 6 in FIG. 1 is 45 cm, and a binary aperture with ten, fourteen, twenty and thirty binary rings is employed. The coefficient k is in the range 1.376 to 1.377. The first four columns relate to the binary aperture and the last two columns relate to the mask annulus.

The method described above thus makes it possible to generate a light beam with substantially uniform axial intensity and an extended depth of focus. The extension is related to the number of rings. For example, with a ten ring aperture, there is a six fold increase in the depth of focus as compared to the case when there is a plane circular aperture. Furthermore, the method is highly efficient, with over 50% of the input light reaching the final focal plane.

If the size of the diffractive element 4 is increased (for example by increasing the number of rings) so that substantially the full power of the Gaussian beam can pass through, over 75% of the input light can reach the final focal plane. In this case, in order to achieve substantially uniform intensity along the beam, the width of the annular aperture should be slightly larger, the value k then being approximately 1.49.

An important aspect of the invention is the ability to include as much power as possible from a laser in the extended focus beam. In general, lasers produce beams which have a Gaussian profile that can be described by the equation:

$$I = I_0 e^{-\frac{2r^2}{w_0^2}}$$

where I is the intensity, r is the radial distance from the centre of the beam and $w_0$ is the Gaussian width of the beam. Such beams are characterized by the fact that the intensity falls off with radius and indeed it is a common problem when dealing with lasers that the intensity in the beam is non-uniform.

When a Gaussian laser beam is used, one way to get a nearly uniform beam is to use just the central portion of the beam. Unfortunately this results in low efficiency as the outer parts of the beam are rejected. With this invention, it is possible to use a significant central portion of the laser beam and retain the benefits of the system (i.e. generating an extended depth of focus beam with good axial uniformity and high efficiency). The trade off is that for a fixed input phase mask, as the Gaussian beam width of the input beam is reduced then the axial uniformity and extent are both reduced. However, acceptable results are produced using a laser beam with a Gaussian width such that 70% of the light in the beam passes through the diffractive element aperture. In this case, w=1.29×the radius of the input aperture of the diffractive element. The figures given in Table 1 were obtained for exactly this case. It should be noted that the positions of the zeros and hence the radii of the annulus are also dependent on the Gaussian width of the input beam.

Figure 5:
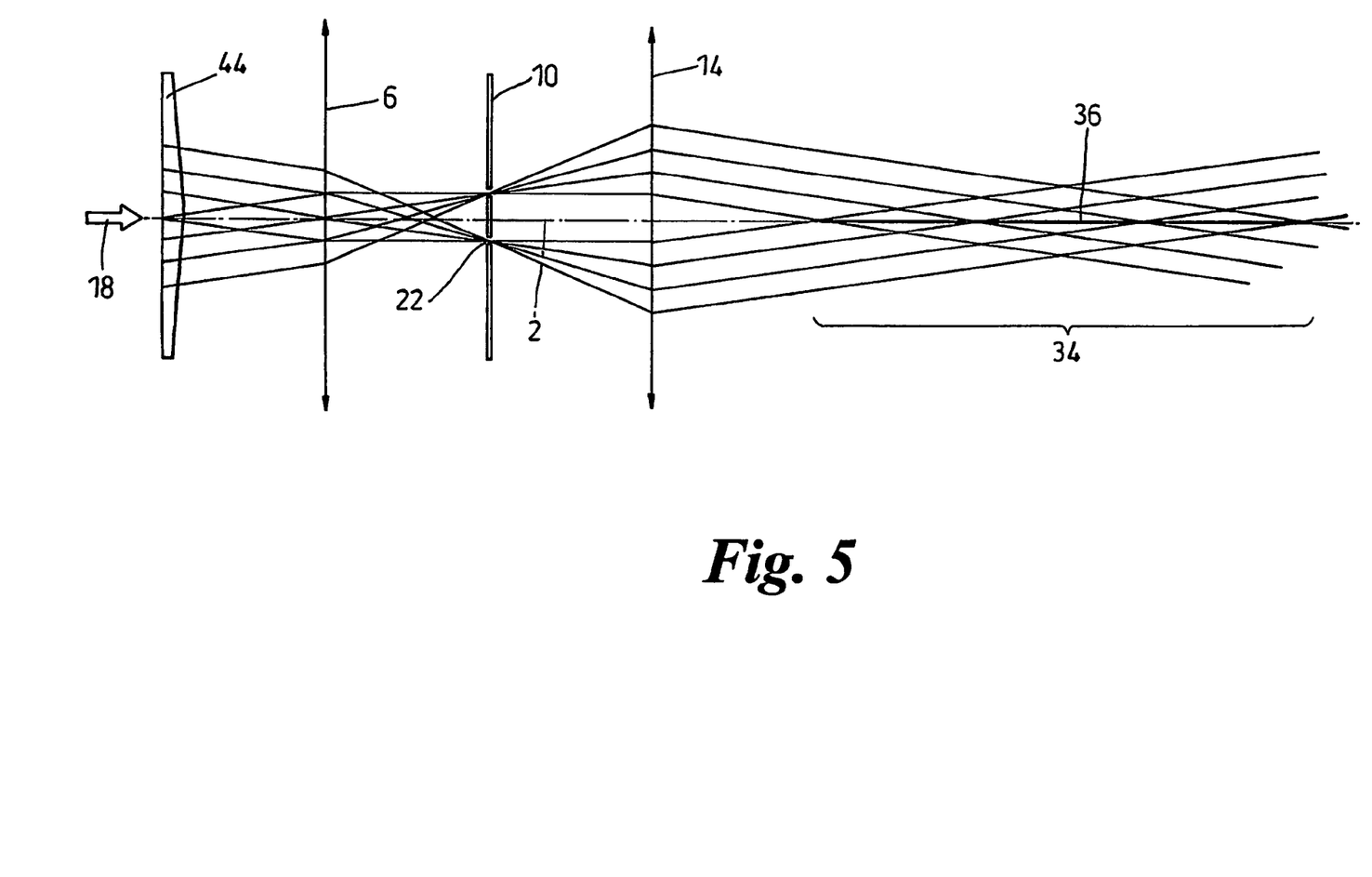
FIG. 5 is a ray diagram of a second apparatus, according to the present invention.

A second embodiment of the invention is shown in FIG. 5, in which the diffractive element is replaced by an axicon 44. Collimated homogeneous light from a laser enters from the left hand side of the diagram in the direction of the arrow 18 and illuminates the axicon 44. The light is refracted by the axicon, producing a converging cone of light that is focussed by the first lens 6, producing a pattern that consists essentially of a bright ring 24 in the rear focal plane 12 of that first lens (i.e. in the plane of the aperture mask 10).

The annular aperture is matched to the width of the main ring 24, so that the whole of the main ring 24 passes through the aperture. The light that passes through the mask 10 is refracted by the objective lens 14, producing a converging cone of light that crosses the optical axis 2.

In the region 34 where the light crosses the optical axis, constructive interference takes place, producing a very narrow and bright beam of light 36 with substantially uniform axial intensity that extends along the optical axis 2.

Figure 6:
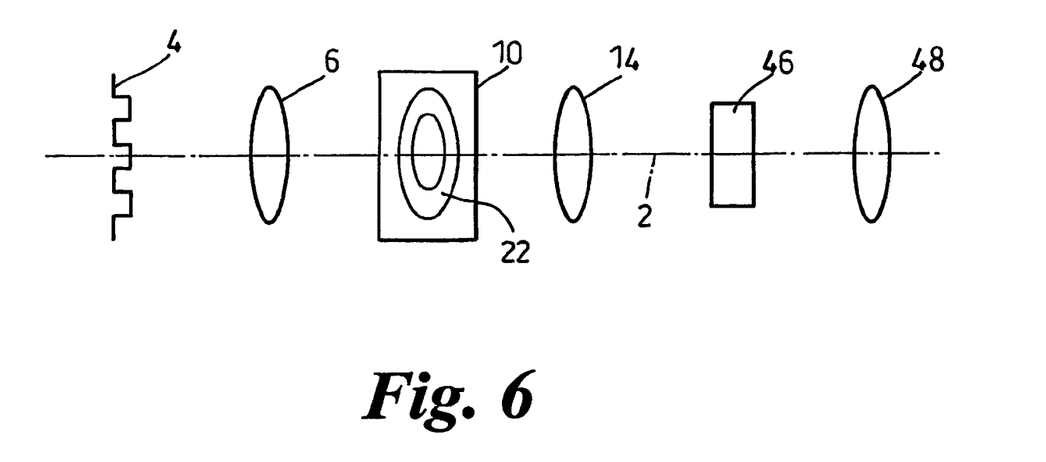
FIG. 6 is a side view of a microscope, according to another aspect of the present invention, showing its optical components.
Figure 7:
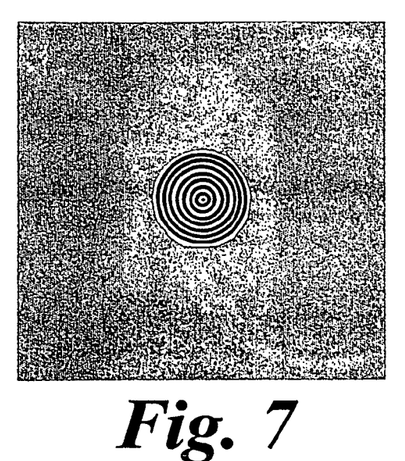
FIG. 7 is a schematic front view of a first diffractive element, according to the present invention.

Once generated, the light beam 36 can be used as the light source in a variety of scanning microscope systems. For example, as illustrated in FIG. 6, the diffractive element 4, the first lens 6, the aperture mask 10 and the second lens 14 may be located so that the extended depth of focus beam can be scanned across a specimen 46. Light passing through the specimen is collected by a collecting lens 48 and focussed onto a detector (not shown), which collects the light and builds up an image of the specimen as it is scanned.

The beam may also be used as the illuminating beam in an otherwise conventional fluorescence scanning microscope. The beam is scanned across a fluorescent object and, where it illuminates the object fluorescence is excited, which is collected by a wide area collector. A two dimensional image of the scanned object can therefore be built up.

At each scan position, fluorescence is emitted by all parts of the object that lie along the axis of the illuminating beam. This produces an image in which an extended portion of the object appears to be in focus, as compared to a conventionally acquired image. However, as the intensity away from the axis of the beam is not zero, there will be some reduction in contrast as compared to an image produced by acquiring multiple confocal images of the same specimen at different depths and then combining those images to create a single extended image. The process is however much faster as the image is acquired in a single scan. If necessary, deconvolution techniques can be applied to restore the contrast.

The beams produced according to the present method are generally narrower than conventional focal spots. The images produced using the beams can therefore exhibit some enhanced lateral resolution.

A second approach is to use the beam as the illuminating beam in a two-photon or multi-photon microscope. This approach (described by Hell et al. "Annular aperture two-photon excitation microscopy", Optics Communications 117 pp 20–24, 1995) is similar to that described above, except that a longer wavelength of light is generally used. Fluorescence is excited non-linearly as the square (or higher power) of the illuminating intensity and, as the brightest parts of the beam lie along its axis, any off-axis fluorescence will be relatively insignificant as compared to that from the axis of the beam. An extended focus image with reduced blur will therefore be produced as the object is scanned.

In each of the above cases, stereo imaging can easily be achieved. If the beam axis is tilted, the extended image produced appears to be viewed from an angle. By capturing two images at different tilt angles a combined stereo pair of images can be produced. The stereo pair can be viewed, making much of the three dimensional structure of the sample visible. The beam can be tilted either by tilting the original illuminating beam at the input plane and shifting the annular mask laterally, or by tilting the beam using mirrors at an intermediate image plane obtained by using additional lenses between the annular aperture and the objective lens.

As well as applications in microscopy, the method of generating extended depth of focus beams may also have other uses, such as in laser machining and micro machining, or in metrology and optical alignment systems.

Further uses of the method, and of extended focal depth beams generated by the method, are in applications where "imaging" in the conventional sense does not take place. These include for example gel reading, bioassays, microassays and "lab-on-a-chip" applications. In these applications, although an image of a kind is produced, this image merely represents the presence or absence at a particular location of a particular fluorphore. The "image" thus contains only binary information, the presence of the fluorphore being represented by +1 and the absence of the fluorphore by 0.

For maximum sensitivity, it is important to excite as much of the fluorphore as possible, and for applications in which the assay is held in a very small well-like vessel, a narrow pencil shaped beam such as that provided by the present invention is likely to provide a distinct advantage.

It should be understood that many of the transmissive optical elements of the apparatus shown in the drawings and described above may be replaced by equivalent reflective optical elements. Thus, for example, the lens may be replaced by curved mirrors, the phase mask may be replaced by an equivalent reflective device and the annular aperture mask may be replaced by an annular reflective element.

Figure 15:
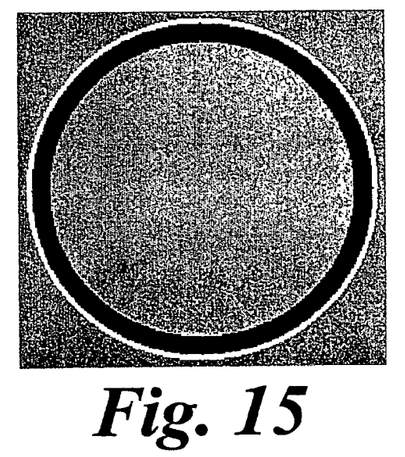
Figure 16:
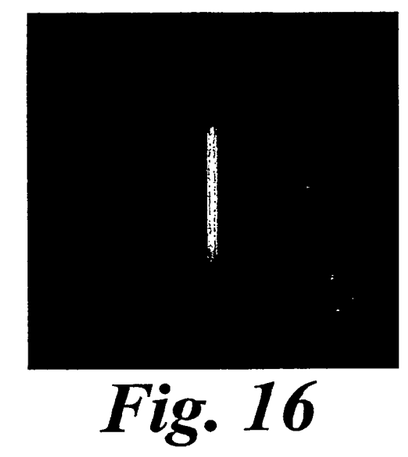
Figure 17:
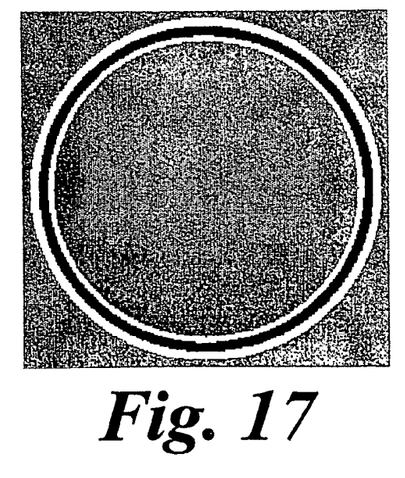
Figure 18:
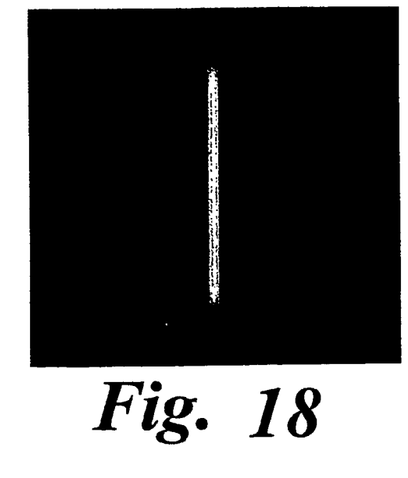

The apparatus may be modified by replacing the simple annular amplitude aperture 22 that forms the aperture mask 10 with a phase modulation mask or a combined amplitude and phase modulation mask. This may result in a further increase in the depth of focus of the light beam. For example, the annular aperture may include a single 180° phase step as shown in FIG. 15, which results in the extended depth of focus beam shown in FIG. 16. Alternatively, the annular aperture may include two 180° phase steps as shown in FIG. 17, which results in a beam with an even greater depth of focus beam, as shown in FIG. 18. Numerous variants of these aperture masks are of course possible, and the possibility of using an amplitude and phase modulation mask applies also to the embodiment of the invention shown in FIG. 5, in which the first diffractive element is replaced by an axicon.

The description of the invention so far given assumes circular symmetry in all the masks. While circularly symmetric solutions may offer the best performance, it is also possible to use non circularly symmetric masks. For example, the input phase mask may have a spiral structure, generating a beam that is essentially an extended tube of light with zero on-axis intensity. Phase modulation in the annular aperture that varies around the circumference can result in similar generated beams. Elliptically shaped mask structures may also be used to produce extended beams with different lateral extents in the x and y directions.

These possibilities are all based on the general principle of using one mask in the input plane to diffract most of the input power into a particular region of the second plane, where amplitude and/or phase modulation are used to modify the characteristics of the generated beam.

TABLE 1

Design measurements used in binary aperture and mask annulus.

| Number of Rings | Outer Ring Radius (micron) | Inner Ring Radius (micron) | Ring Spacing (micron) | Outer Radius of Mask Annulus (micron) | Inner Radius Mask Annulus (micron) |
|---|---|---|---|---|---|
| 10 | 538 | 38 | 50 | 2668 | 2120 |
| 10 | 1075 | 75 | 100 | 1334 | 1060 |
| 10 | 2150 | 150 | 200 | 667 | 530 |
| 14 | 738 | 38 | 50 | 2594 | 2194 |
| 14 | 1475 | 75 | 100 | 1297 | 1097 |
| 14 | 2950 | 150 | 200 | 649 | 549 |
| 20 | 1038 | 38 | 50 | 2536 | 2252 |
| 20 | 2075 | 75 | 100 | 1268 | 1126 |
| 20 | 4150 | 150 | 200 | 634 | 563 |
| 30 | 1538 | 38 | 50 | 2490 | 2298 |
| 30 | 3075 | 75 | 100 | 1245 | 1149 |
| 30 | 6150 | 150 | 200 | 623 | 575 |

Various modifications and alterations to the invention may be appreciated based on a review of this disclosure. These changes and additions are intended to be within the scope and spirit of the invention as defined by the following claims.

What is claimed is:

1. An apparatus for generating a beam of light having extended depth of focus, the apparatus comprising along an optical axis:
    a. a first section for generating, in a first focal plane, a diffraction pattern including a bright main ring;
    b. a second section comprising an aperture located in the first focal plane, the radius of the aperture being substantially equal to the radius of the main ring and the width of the aperture being slightly greater than the width of the main ring; and
    c. a third section that causes light passing through the aperture to converge toward and cross the optical axis, the apparatus being constructed and arranged such that constructive interference occurs generally where the converging light crosses the optical axis, thereby generating, along the axis, a beam of light having extended depth of focus.

2. The apparatus set forth in claim 1, wherein the first section includes a diffractive element.

3. The apparatus set forth in claim 2, wherein the diffractive element includes a plurality of concentric phase rings.

4. The apparatus set forth in claim 2, wherein the diffractive element includes a plurality of concentric phase and amplitude rings.

5. The apparatus set forth in claim 1, wherein the first section includes a positive lens element arranged such that its rear focal plane coincides with the aperture.

6. The apparatus set forth in claim 1, wherein the third section includes a positive lens element arranged such that its front focal plane coincides with the aperture.

7. The apparatus set forth in claim 1, further comprising a coherent light source.

8. The apparatus set forth in claim 7, wherein the coherent light source comprises a collimated laser.

9. The apparatus set forth in claim 1, wherein the inner radius $R_1$ and the outer radius $R_2$ of the aperture are defined in terms of radii $a_1$ and $a_2$, respectively, of minima on either side of a main lobe of the diffraction pattern, according to the equations:

$$R_1 = (a_1 + a_2)/2 - k(a_2 - a_1)/2$$

$$R_2 = (a_1 + a_2)/2 + k(a_2 - a_1)/2$$

where k is a coefficient generally within a range of 1 and 2.

10. The apparatus set forth in claim 9, wherein the width W of the aperture is defined by the equation $W = k(a_2 - a_1) = KA$, where A is the width of the main ring.

11. The apparatus set forth in claim 1, wherein the aperture includes phase modulation elements.

12. The apparatus set forth in claim 1, wherein the aperture includes a plurality of phase rings.

13. A scanning microscope including an apparatus for generating a beam of light having extended depth of focus, a first device for scanning the light beam across a specimen, a second device for detecting light reflected or emitted by the specimen and a third device for constructing an image of the specimen in response to the detected light.

14. The microscope set forth in claim 13, wherein the microscope is a fluorescence scanning microscope.

15. The microscope set forth in claim 13, wherein the microscope is a two-photon or multi-photon microscope.

16. The microscope set forth in claim 13, including a fourth device for tilting the axis of the beam, wherein the third device is constructed and arranged so as to create a stereo pair of images at different tilt angles.

17. A method for generating a beam of light having extended depth of focus, the method comprising the steps of:
    a. generating, in a first focal plane, a diffraction pattern having a bright main ring;
    b. modifying the diffraction pattern using an aperture located in the first focal plane, the radius of the aperture being substantially equal to the radius of the main ring and the width of the aperture being slightly greater than the width of the main ring; an c. causing the light passing through the aperture to converge toward and cross an optical axis, such that constructive interference occurs generally where the converging light crosses the optical axis, thereby generating a beam of light along the axis having extended depth of focus.

18. The method set forth in claim 17, wherein the diffraction pattern is generated by a diffractive element.

19. The method set forth in claim 18, wherein the diffractive element includes a plurality of concentric phase rings.

20. The method set forth in claim 18, wherein the diffractive element includes a plurality of concentric phase and amplitude rings.

21. The method set forth in claim 17, wherein the diffraction pattern is focused in a first plane by a positive lens element arranged such that its rear focal plane coincides with the aperture.

22. The method set forth in claim 17, wherein light passing through the aperture converges toward an optical element using a positive lens element arranged such that its front focal plane coincides with the aperture.

23. The method set forth in claim 17, wherein the light is generated using a coherent light source.

24. The method set forth in claim 23, wherein the coherent light source comprises a collimated laser.

25. The method set forth in claim 17, wherein the inner radius R sub 1 and the outer radius $R_2$ of the aperture are defined in terms of radii $a_1$ and $a_2$, respectively, of minima on either side of a main lobe ring of the diffraction pattern, according to the equations:

$$R_1 = (a_1+a_2)/2 - k(a_2-a_1)/2$$

$$R_2 = (a_1+a_2)/2 + k(a_2-a1)/2$$

where k is a coefficient generally within a range of 1 and 2.

26. The method set forth in claim 25, wherein the width W of the aperture is defined by the equation $W = k(a_2-a_1) = KA$, where A is the width of the main ring.

27. The method set forth in claim 17, wherein the aperture includes phase modulation elements.

28. The method set forth in claim 27, wherein the aperture includes a plurality of phase rings.

29. The method set forth in claim 17, further comprising the steps of scanning the light beam across a specimen using a scanning microscope, detecting light reflected or emitted by the specimen, and constructing an image of the specimen in response to the detected light.

30. The method set forth in claim 29, wherein light emitted by fluorescence of the sample is detected.

31. The method set forth in claim 30, wherein a two-photon or multi-photon excitation method is employed.

32. The method set forth in claim 29, further including the steps of tilting the axis of the beam, and constructing a stereo pair of images at different tilt angles.

33. The apparatus set forth in claim 1, further comprising, in series, a binary phase mask, a positive lens an annular aperture mask and an objective lens.

34. The method set forth in claim 17, further comprising steps wherein the light passes through a binary phase mask, a positive lens, an annular aperture mask and an objective lens.

* * * * *